US010728365B2

(12) United States Patent
Boukari

(10) Patent No.: US 10,728,365 B2
(45) Date of Patent: Jul. 28, 2020

(54) PROCESS AND DEVICE FOR SEARCHING FOR A PLACE

(71) Applicant: Morou Boukari, Toulouse (FR)

(72) Inventor: Morou Boukari, Toulouse (FR)

( * ) Notice: Subject to any disclaimer, the term of this patent is extended or adjusted under 35 U.S.C. 154(b) by 325 days.

(21) Appl. No.: 15/181,674

(22) Filed: Jun. 14, 2016

(65) Prior Publication Data

US 2017/0004214 A1    Jan. 5, 2017

Related U.S. Application Data

(63) Continuation-in-part of application No. 14/739,426, filed on Jun. 15, 2015.

(60) Provisional application No. 62/012,437, filed on Jun. 16, 2014.

(51) Int. Cl.
| | |
|---|---|
| *G06F 16/00* | (2019.01) |
| *H04L 29/06* | (2006.01) |
| *G06N 5/04* | (2006.01) |
| *G06F 16/2457* | (2019.01) |
| *G06F 16/29* | (2019.01) |

(52) U.S. Cl.
CPC ........ *H04L 67/42* (2013.01); *G06F 16/24575* (2019.01); *G06F 16/29* (2019.01); *G06N 5/04* (2013.01)

(58) Field of Classification Search
None
See application file for complete search history.

(56) References Cited

U.S. PATENT DOCUMENTS

| 6,204,800 | B1 * | 3/2001 | Neumann | G01S 13/90 |
| | | | | 342/104 |
| 6,331,870 | B1 * | 12/2001 | LeCompte | G01C 11/025 |
| | | | | 348/144 |
| 6,634,600 | B2 * | 10/2003 | Krawczyk | B64G 1/1021 |
| | | | | 244/158.4 |
| 6,745,115 | B1 * | 6/2004 | Chen | B64D 45/04 |
| | | | | 244/75.1 |

(Continued)

OTHER PUBLICATIONS

Rodolphe Bauer, Preliminary Search Report, Institut National de la Propriete Industrielle, French Patent Application 1,555,430, dated Feb. 2, 2016.

(Continued)

*Primary Examiner* — Debbie M Le
(74) *Attorney, Agent, or Firm* — Young & Thompson

(57) ABSTRACT

The invention relates to a process for searching for a place on the basis of a free request of parameters defined by a user on a peripheral unit connected to a central unit, remarkable in that it comprises the following steps:
  a step of selecting and grouping types of parameters,
  spatial cutting of the earth's surface into surface cells, with said cells being associated with a plurality of sensors,
  associating data with a type of parameters and with a surface cell in order to obtain data sub-sets,
  processing and storing the data sub-sets,
  constituting the free request,
  analyzing the language and the interpretation of the free request,
  searching for and selecting surface cells associated with the sorted and selected data,
  displaying the place corresponding to the surface cells found.
The invention also relates to a device implementing said process.
Uses: Expediting the search for places.

15 Claims, 3 Drawing Sheets

(56) References Cited

U.S. PATENT DOCUMENTS

| | | | | |
|---|---|---|---|---|
| 6,811,113 B1* | 11/2004 | Silansky | B64B 1/02 244/115 |
| 7,386,373 B1* | 6/2008 | Chen | G01C 5/005 340/961 |
| 7,599,988 B2* | 10/2009 | Frank | G06F 17/3087 701/418 |
| 7,698,058 B2* | 4/2010 | Chen | G01C 23/00 340/945 |
| 7,917,464 B2* | 3/2011 | Frank | G06F 17/30241 707/602 |
| 7,953,732 B2* | 5/2011 | Frank | G06F 17/30241 707/724 |
| 7,962,252 B2* | 6/2011 | Shams | G05D 1/101 345/601 |
| 7,983,949 B1* | 7/2011 | Joseph | G06Q 30/02 382/109 |
| 8,018,458 B2* | 9/2011 | Peterson | G06F 17/30241 345/418 |
| 8,650,220 B2* | 2/2014 | Rohlf | G06F 17/30241 345/653 |
| 9,392,044 B2* | 7/2016 | Peterson | H04W 4/029 |
| 9,422,922 B2* | 8/2016 | Sant'Anselmo | F03D 9/007 |
| 2010/0332468 A1* | 12/2010 | Cantrell | G06F 17/30241 707/724 |
| 2011/0153186 A1* | 6/2011 | Jakobson | G01C 21/20 701/532 |
| 2013/0179116 A1* | 7/2013 | Rahman | A41D 1/002 702/150 |
| 2014/0107932 A1* | 4/2014 | Luna | G01D 21/00 702/19 |
| 2014/0279261 A1 | 9/2014 | Krishna Kolluri et al. | |
| 2015/0088792 A1* | 3/2015 | O'Neill | G06N 99/005 706/12 |
| 2015/0088853 A1* | 3/2015 | McDonald | G06F 17/30038 707/711 |

OTHER PUBLICATIONS

Benjamin Adams et al., "Frankenplace: An Application for Similarity-Based Place Search," Conf. Proc. ICWSM 2012, Dublin, IR, Jun. 7, 2012, pp. 616-617.

Alfred A. Kuehn, et al., "High-Value PC-Based GIS Applications in Business," System Sciences, 1994, vol. IV: Information Systemss: Collaboration Technology Organizational Systems and Technology; Proceedings of the Twenty-Seventh International Hawaii Onference on Wailea, HI, Jan. 4-7, 1994, Los Alamitos, CA, IEEE Comp. Jan. 4, 1994, pp. 327-336.

Emile Bruenau et al., "Recherches Textuelles, Codage Automatique, Codage Assiste; Exemples," Courrier ds Statistiques, No. 81-82, Jun. 1, 2007, pp. 45-45.

* cited by examiner

PROCESS AND DEVICE FOR SEARCHING FOR A PLACE

FIELD OF USE OF THE INVENTION

This invention relates to the field of searching for a place and in particular to adaptations making it possible to perform said searches under the best conditions.

DESCRIPTION OF THE PRIOR ART

Normally, one may spend several days obtaining complete information on the destination of a place, in particular for a vacation. It is indeed necessary today to consult multiple sources of information, which are often incomplete and dispersed throughout the world.

Document US2014279261 describes methods, systems and devices comprising computer programs encoded on computer storage supports, intended for computerized travel services. One of the methods comprises the following operations: receiving a travel request; identifying points of interest or destinations associated with a place of travel; for each one of the points of interest or destinations: determining photographs which are geographically associated with the point of interest or with the destination, selecting a photograph selected from the photographs; obtaining a description associated with the point of interest or with the destination, obtaining a price for a hotel associated with the point of interest or with the destination and obtaining a price for a flight corresponding to the point of interest or to the destination; and, for each one of the points of interest or destinations, transmitting a result relative to the request comprising the selected photographs, the description, the respective hotel prices and prices for flights.

This document does not precisely describe the technical characteristics that make it possible to implement the invention and in particular those making it possible to make available to the user the data that he is searching for. As such, although this document calls for a search in natural language, this language is used to give the name of the place or of the destination requested by the user but not for searching a place on the basis of the desired parameters.

DESCRIPTION OF THE INVENTION

The applicant has therefore conducted research intended to enable any person at any institution or organization (civil or military) to locate and choose a place in the entire world to stay temporarily, work, etc., without knowing the name of said place, but by transmitting wishes or desires of what the person would like to encounter, see, feel, live or do there and so on.

Another objective of the invention is to obtain this result very quickly and thus save an enormous amount of time by avoiding the need to consult multiple sources of information.

To do this, the applicant has imagined a new process for searching for a place on the basis of a free request of parameters defined by a user on at least one peripheral unit for interrogation connected to at least one central data processing unit, which is characterized in that it includes:
- a step of selecting and grouping types of parameters,
- a step of spatial cutting of the terrestrial globe into surface cells according to said selection and said grouping, said cells being associated with a plurality of sensors that record identifiable parameters of said cells.
- a step of associating data at the output of the recording sensors with a type of parameters and with a surface cell in order to obtain data sub-sets,
- a step of treating and storing data sub-sets in the aforementioned at least one central unit.
- a step of constituting the free request by the user on said at least one peripheral unit for interrogation in liaison with the at least one aforementioned central unit.
- a step of analysis of the language and interpretation of the free request with identification of parameters or of the type of parameters and the generation of keywords and conditions for searching, sorting and selecting said data sub-sets,
- a step of searching for and selecting surface cells associated with the sorted and selected data,
- a step of displaying on the abovementioned at least one peripheral unit for interrogation of the place or places corresponding to the surface cells found.

The process as such proposes a reverse search. Such a reversal of the search makes it possible to very quickly provide the user of the process with a place or a plurality of places corresponding to the parameters defined in the request by the user.

Thus, by simply expressing a wish or desires, for example for activities, climatic, environmental, socioeconomic, political, military, safety, strategic, sanitary, and housing conditions, the user may obtain one or more places as a response.

According to another particularly advantageous characteristic of the invention, the free request is carried out in natural language. This is software that recognizes the words used in the request to generate keywords and/or to identify the parameters or the type of parameters.

In addition to the identification of the parameters that can be quantified, the software also recognizes in the request a value, a quantification that will come into correspondence with the quantification of the parameters proposed by the recording sensors.

The process of the invention enables accelerated searches and thus saves time. It also makes it possible to perform more complete searches.

There is a plurality of known technical means used to carry out the cutting of the earth's surface such as the cutting proposed by the standard ISO 3166-1 alpha 2 or alpha 3 or digital alpha. This international standard is used for cutting the world into countries with the assigning of a code to each country. The standard ISO-3166-1 alpha 2 or alpha 3 or digital alpha can be combined with standard ISO 3166-2 which is used for the cutting of each country into subdivisions with the assigning of a code to each subdivision.

The standard ISO 3166 (−1 and −2) is already used by banks for transferring money (bank code making it possible to see where the bank is located), for airlines for transporting passengers and freight (country code, city, airport) and also for sending mail by the post.

Another existing technical means for spatial cutting is that known as NUTS (Nomenclature of Units for Territorial Statistics) and LAU (Local Administrative Units). LAUs are a subdivision of the NUTS. NUTS are conventionally used by EUROSTAT and many other countries. NUTS correspond, in a country, to the regions and LAUs to the towns.

The techniques according to ISO 3166 (−1 and −2) or that of NUTS and LAU result in the cutting of the earth's surface into countries, of the countries into regions and of the regions into towns.

The size of the surface units vary according to the continents, according to the countries and according to the regions.

The invention therefore does not propose an assigning of geographical coordinates (longitude, latitude, altitude) to a given location. This is also not a use of GPS or of GIS techniques (Geographic information system) known in prior art and which use geographical coordinates (longitude, latitude, altitude) for storing data linked to a point of interest.

According to the type of parameters, the cutting can be different and more or less accurate. Starting from the moment when, after a first search, a different cutting can be proposed, the software requires from the user more precision linked to the parameter or parameters identified before displaying the location or locations identified as responding to the parameters sought.

Likewise starting from the instant where a quantification is possible and available according to the parameter identified in the request without this quantification being itself detected in the request, the software requires more precision linked to the quantification of said parameter. As such, according to another particularly advantageous characteristic of the invention, the process comprises the following operation:

proposing to the user once the first search is carried out, quantifications for the parameters identified for the purpose of optimizing the search.

According to another particularly advantageous characteristic of the invention, the process comprises the following operation:

proposing to the user once the first search is carried out, types of parameters available but different from those identified in his request for the purpose of optimizing the search.

This process requires the sorting, parameterization and storage of a large amount of data. Moreover, the applicant has advantageously imagined another process characteristic that is characterized in that it includes the production of data sub-sets, each having the following data fields:

geographical name or names of the surface cell,
the type of parameter associated with said surface cell,
the nature of said parameter,
the quantification of said parameter,
the temporal validity of the quantification of said parameter,
the date/time of update of the preceding fields,
the source/origin of the fields completed.

The type of parameters depends on the recording sensors present in said surface cells and the data that they can provide.

As such, according to a particularly advantageous characteristic of the invention, these sensors are sensors that measure parameters of the meteorological type such as:

sensors for measuring temperature,
sensors for measuring humidity,
sensors for measuring atmospheric pressure,
sensors for measuring rainfall,
sensors for measuring sunshine,
sensors for measuring wind speed,
sensors for measuring snowfall,
sensors for measuring wave heights,
etc.

Whether or not associated with these data sensors, other sensors that can be qualified in qualitative terms measure other parameters such as:

sensors for measuring air pollution,
sensors for measuring water pollution,
sensors for measuring the visitation frequency of the places,
sensors for measuring insecurity,
sensors for measuring the health risk linked to food,
sensors for receiving data on airline flights for reservations,
etc.

The various data sub-sets formed by the data coming from measurements taken by said sensors ensure to the user that the various parameters of his request are taken into account.

In order to make it possible to obtain a search result going beyond a search for vacation spots, but also in order to complement the latter, the applicant has advantageously imagined the creation of sub-sets of unreported data.

Thus, according to another particularly advantageous feature, the parameter type is political. Indeed, it should be noted that the destinations proposed and the destinations where it is, for example, dangerous to go may not match up. Such a difference requires the consultation of multiple information sites (for example a travel site and the site of the department of foreign affairs). The invention makes it possible to do without this type of resource so as to avoid the need to consult multiple sites.

According to another particularly advantageous feature, the parameter type is military. Indeed, for military missions, it is important to know whether, in the location where it is envisaged to conduct military operations with a possible quick withdrawal of troops, there is/are:

a military base for the country of origin of the troops, a military base for an ally country, a military base for an enemy country;
logistics support cells for the country of origin of the troops, logistics support cells for an ally country, logistics support cells for an enemy country;
intelligence officers for the country of origin of the troops, intelligence officers for an ally country, intelligence officers for an enemy country;
hostilities among the local populations with regard to nationals of the country of origin of the troops.

According to another particularly advantageous feature, the parameter type is educational. Such a data sub-set may satisfy requests concerning an education request.

According to another particularly advantageous feature, the parameter type is of a sanitary nature. Such a data sub-set may complement responses to requests requiring the presence of a vaccine.

According to another particularly advantageous feature, the parameter type is administrative. Such a data sub-set may complement responses to requests requiring administrative formalities.

According to another particularly advantageous feature, the parameter type is of a security nature.

According to another particularly advantageous feature, the parameter type is geopolitical and strategic.

According to another particularly advantageous feature, the parameter type is environmental.

The invention also relates to the device enabling said process to be implemented, and which is characterized in that it includes at least one server for storing and managing said data sub-sets with which the data entry modules provided by the recording sensors and search modules in said data sub-sets communicate. This server is connected by a digital network to at least one client computer having artificial intelligence for analysis and interpretation of the free request enabling it to interact with the user so as to collect a character string representing the free request and also provide the user with results in the form of multimedia documents (text, animated or still images, sound, 3D representations, etc.).

More specifically, the device includes at least one so-called server unit containing data sub-sets organized in bytes, each byte being comprised in particular of the data listed above for the sub-sets described above.

According to another feature, the device is characterized in that each surface cell or set of surface cells includes a plurality of recording sensors of at least one identifiable parameter.

Examples of technologies that can implement the measurement of parameters described hereinabove are numerous. However, among the latter, the applicant has carried out the selection of the following devices.

In order to implement the measuring of rainfall, the device of the invention comprises, in the surface cell, a sensor that measures the variations of a light ray due to the refraction caused by the presence of water.

In order to implement the measuring of sunshine, the device of the invention comprises an array of photodiodes arranged according to a particular geometry that measures the radiation. The use of several photodiodes ensures that at least one directly receives the solar radiation and allows for accurate measurement in all conditions. At least one photodetector receives the light directly from the sun (in addition to the diffuse component), the photodiodes which are not directly illuminated by the sun, are used to measure the diffused light which is subtracted from the measurement of the sensor that directly sees the sun in order to obtain direct radiation.

In order to implement the measuring of snowfall, the device of the invention comprises a satellite that, carrying optical sensors, produces images of the snow cover of the surface cell concerned. The sensor is then not physically present in the surface cell. The images obtained are treated by different algorithms in order to determine snowfall.

Whether or not in association with the preceding characteristic in order to carry out the same function, the device of the invention comprises a distance sensor that measures the delay between the transmitting and receiving of an emitted acoustic pulse which as such makes it possible to measure the thickness of a layer of snow.

In order to implement the measuring of the speed of the wind, the device comprises a weather vane module associated with a horizontal wind turbine. According to another technology, the device comprises a temperature measurement probe whereon the cooling effect caused by the wind is measured.

In order to implement the measuring of the height of waves, the device comprises an immersed acoustic current profiler. Whether or not associated with the preceding characteristic in order to carry out the same function, the device further comprises an immersed velocimeter and/or a current meter.

In order to implement the measuring of the quality or of the pollution of the water and participate in the parameter of the environmental type, the device comprises glass capillary tubes provided with specific antibodies and LEDs used in medical imaging for the purpose of detecting *Escherichia coli* bacteria. Other detection modules are able to test for the presence of heavy metals such as mercury, iron, arsenic, chromium, lead or cyanide in the water.

According to another characteristic, the device comprises a multifunction probe that simultaneously analyzes thirteen parameters.

There are also prepositioned measuring stations for measuring the quality of the surface water that, forming networks, are able to be exploited for the implementation of the invention.

In order to implement the measuring of the air pollution, there is a plurality of technical means for measuring the characteristic indicators of the quality of the air such as:
the quantity of Volatile Organic Compounds,
the level of carbon dioxide,
the level of carbon monoxide,
the level of fine particles,
the temperature,
rate of relative humidity,
dust,
nitrogen dioxide,
ozone,
sulfur dioxide,
the quantity of pollens.

As for the quality of the water, there are stations that are already prepositioned for measuring the quality of the air which, forming networks, are able to be exploited for the implementation of the invention.

According to another characteristic of the invention, the device comprises a sensor for receiving air data.

According to another characteristic of the invention, the device comprises a recording sensor for flight offers from airlines.

In order to provide data on the less habitual parameters in the framework of searching for a destination, the invention further comprises original sensors that provide information on original parameters.

As such, for example, in order to implement the measuring of the visitation frequency, the device comprises a module for geolocating tourists which makes it possible to know their positions and their movements. This locating module can comprise a sensor associated with each tourist or depend on a mobile application. The visitation frequency data can also be supplied by the establishments that receive said tourists.

According to another technology, the device comprises a camera associated with a software for detecting the presence of the human face. It is then possible to provide frequency and movement data on the persons detected for the purpose of implementing the process of the invention.

According to another characteristic, the device comprises a network of small video sensors placed at certain key locations associated with a software for detecting the presence of the human face.

According to another characteristic, the device comprises a sensor that detects around it, the presence of mobile telephones that ensure the supply of visitation frequency data for a location.

In order to implement the measuring of the insecurity on a surface cell and participate in the parameter of the security type, there are applications for mobile telephone that provide information on the level of insecurity according to the geolocalisation and the time of day. Such an application is based on public data and reports from bodies in charge of security. This data can be used directly or through the intermediary of the application in order to supply this parameter for the implementing of the invention.

According to another characteristic, the device comprises a camera coupled to a software for analyzing behavior in order to identify suspicious behavior.

In order to implement the measuring of food insecurity in a surface cell, the device comprises a sensor that makes it possible to detect the molecules produced during the decomposition of food (ethanol, biogenic amines, etc.) in the packaging of food present in said surface cell. According to another characteristic this sensor is a radiofrequency label of the RFID type.

According to another characteristic, the sensor measures the permittivity of the food for the purpose of determining if the permittivity measured corresponds to that of a fresh food or that of a contaminated food.

It appears that a plurality of the technical means is likely to supply all or a portion of the parameters sought. These technical means can already be prepositioned on the surface cells and then be used for this new function namely the supply of data that can respond to the requests from users of the process of the invention. Likewise, several means of measuring are able to supply data concerning several of the parameters sought, without all of them being used. It is therefore not necessary to install a sensor dedicated to each parameter sought.

It is further understood that, according to the parameter measured, the sensors supply the data concerning a single surface cell or a plurality.

In addition, it appears that a plurality of parameters is able to be measured or recorded using mobile modules that can be connected or integrated into mobile telephones. As these telephones can be geolocalised, it is then possible to have for surface cells concerned, measured localised data.

Finally, most of the sensors can be connected to a network in order to store the data measured and make it available.

The fundamental concepts of the invention disclosed above in their most basic form, other details and features will become clearer in view of the following description and the appended drawings, providing, by way of a non-limiting example, an embodiment of a device according to the invention.

DESCRIPTION OF A PREFERRED EMBODIMENT

Figure 1:
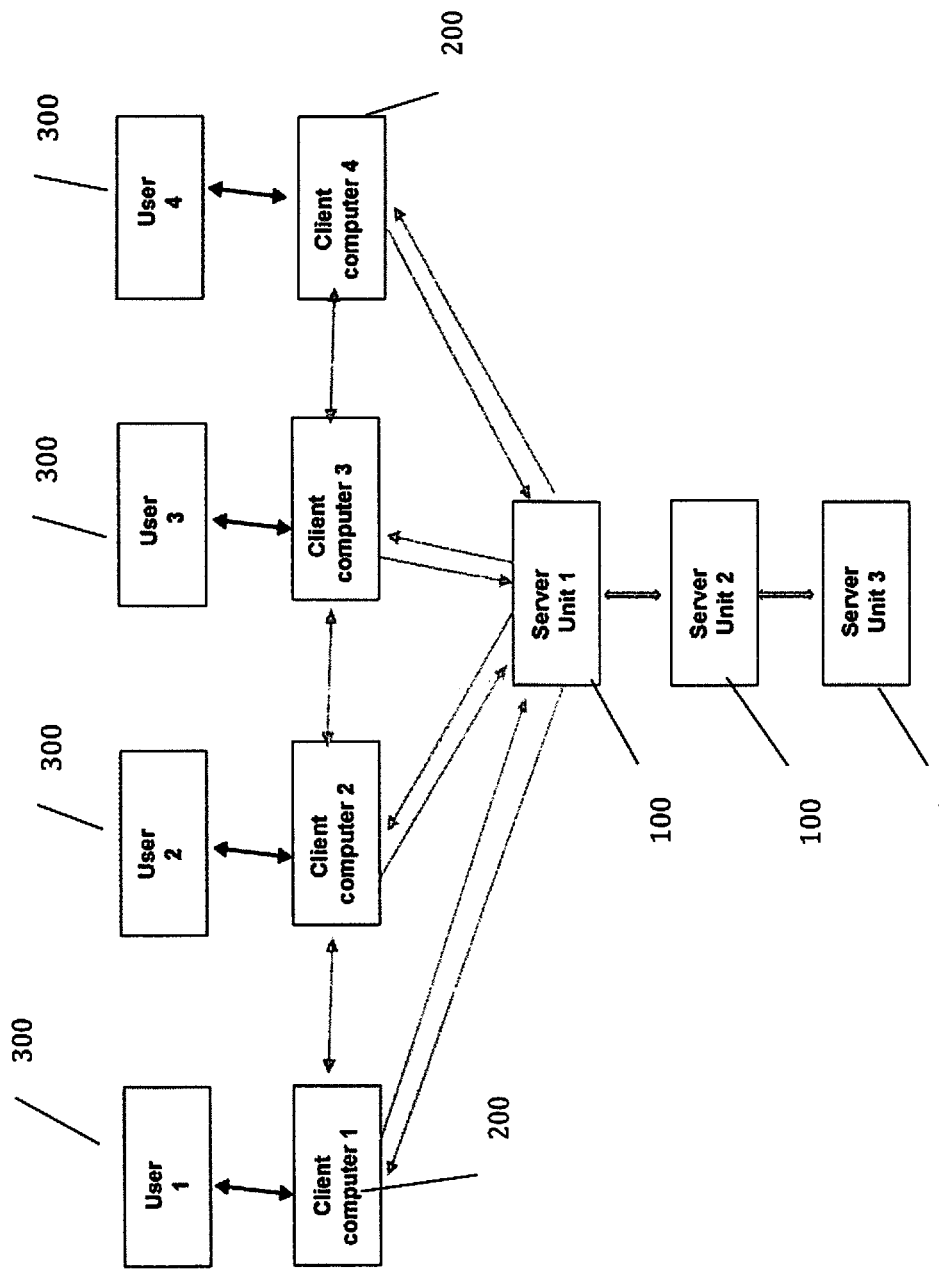
FIG. 1 is a diagram of an embodiment of a digital network according to the invention.

As shown in the drawing of FIG. 1, the reverse search device is comprised of at least one so-called server unit 100 (reference 3 here) containing a specific document database connected by a digital network to at least one client computer 200 having artificial intelligence for analysis and interpretation enabling it to interact with the user 300 so as to collect a character string representing the free request and also provide the user with results in the form of multimedia documents (text, still images, animated images, sound, 3D representation, etc.).

The data of the specific document database of the server unit are in the form of data sub-sets each forming a septuple, each septuple being comprised of:
   a surface cell denoted S1 (not shown), obtained from the spatial cutting of the terrestrial globe into basic units,
   the parameter type denoted S2 associated with the surface cell S1,
   the nature of the parameter denoted S3,
   the quantification of the parameter denoted S4,
   the temporal validity of the quantification of the parameter denoted S5 (not shown),
   the date/time of update of the quintuple (S1, S2, S3, S4, S5) denoted S6 (not shown),
   the source of said quintuple (S1, S2, S3, S4, S5) denoted S7 (not shown).

Figure 2:
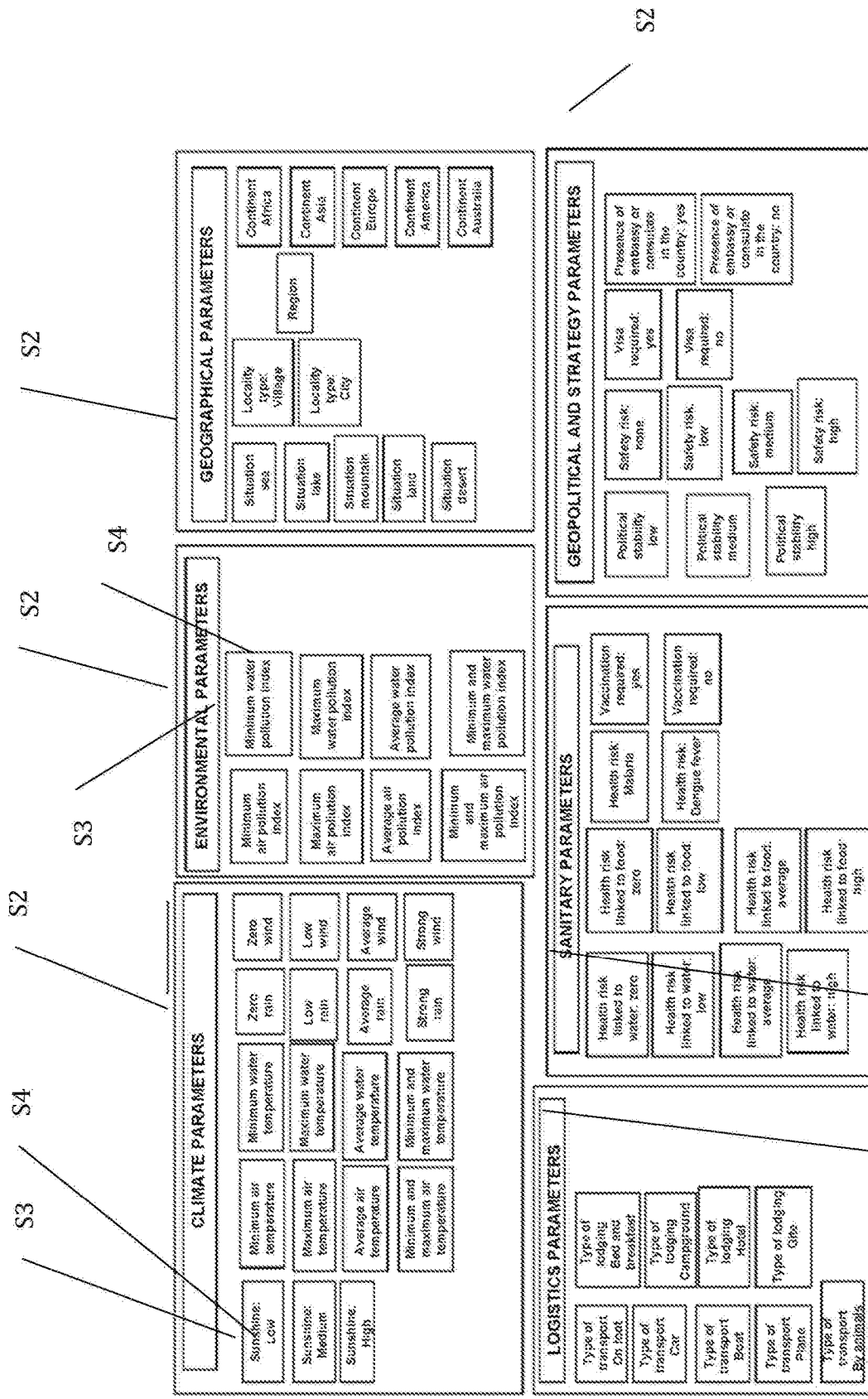
FIG. 2 is a diagram showing the structure of the data sub-sets on six types of parameters.
Figure 3:
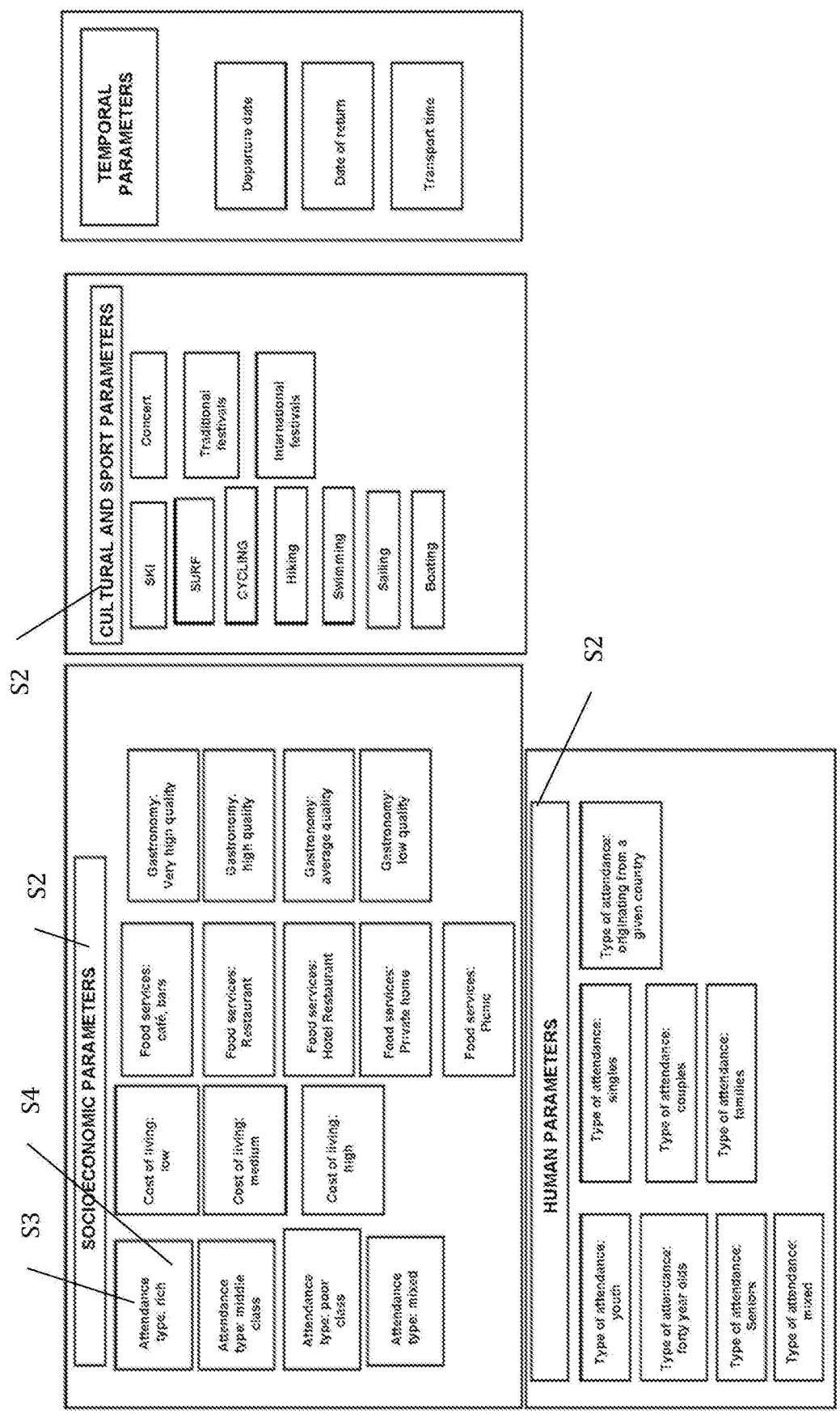
FIG. 3 is a diagram showing the structure of the data sub-sets on three other types of parameters.

The drawings of FIGS. 2 and 3 show steps S2, S3 and S4.

The analysis and interpretation of the free request at the level of the peripheral unit or client computer is performed by searching for relevant elements owing to the presence in the artificial intelligence program of one or more series of scripts making it possible to identify character strings responding to a univocal descriptive syntax. For each relevant element identified, the client computer generates the conditions for the search request, selection and sorting in the database of the data sub-sets contained in the central data processing unit or server computer. The following parts explain how, owing to the existence of a document database, the structure of which is explained, it is possible to search for elements relevant to a user request with an adequate translation.

Thus, on the basis of the structure described above, each data sub-set constitutes a multiplet of seven items, therefore a septuple comprised of S1, S2, S3, S4, S5, S6 and S7, with the following steps:
   S1: surface cell;
   S2: parameter type;
   S3: property of the parameter;
   S4: quantification of the parameter;
   S5: temporal validity of the quantification of the parameter;
   S6: date/time of update of this quintuple;
   S7: source of said quintuple.

An example of a data sub-set may be:
   (Toulouse; Climatic parameter; air temperature; 25° C.; 15 Jun. 2015 2:00 pm-15 Jun. 2015 3:00 pm; Météo-France forecast)

Another example may be:
   (Toulouse; Cultural parameter; Gastronomic reputation; good; 2014; Michelin Guide).

An example of a search for relevant elements in the text of the free request (at the level of the client computer) is described below:

Thus, for a free request of the user worded as follows:
"I would like to go to a place with nice weather with a temperature of 25° C. with good gastronomy."

A series of scripts makes it possible to identify character strings responding to a univocal descriptive syntax.

The simplest case concerns the character strings "Nice weather" or "good gastronomy".

A more complex case concerns the temperature. It is detected in the text when a series of numbers precedes the strings "° C." or "° F." or "° K".

The translation into requests on the data sub-sets is described below.

For each relevant element identified, conditions are generated for the search request in the database for the data sub-sets.

Example 1: the relevant element "nice weather" is converted into the following condition:
   S3="Air temperature" AND S4>=20° C.

Example 2: the relevant element "good gastronomy" is converted into the following condition:
   S3="Reputation for gastronomy" AND (S4="good" OR S4="superior" OR S4="excellent").

The syntaxes of elements of conditions of requests presented above are known in SQL (structured query language"

and NoSQL (database management system that is not based on the conventional architecture of relational bases) databases.

The invention makes it possible to obtain a response in less than one minute.

One of the responses to this free request may be:

"Toulouse, France; air temperature; 25°; 15 Jun. 2015 2:00 pm-30 Jun. 2015 3:00 pm".

It is understood that the process and the device have been described and illustrated for the purpose of disclosure rather than limitation. Of course, various arrangements, modifications and improvements may be made to the above example without going beyond the scope of the invention.

The invention claimed is:

1. A process of reverse searching for a place or places on the basis of a free request of parameters defined by a user on at least one peripheral unit for interrogation connected to at least one central data processing unit, comprising:
   a step of selecting and grouping types of parameters,
   a step of spatial cutting the terrestrial globe into surface cells according to said selection and grouping of parameters, said cells being associated with a plurality of sensors that record identifiable parameters of each of said cells,
   a step of associating data from the sensors with the types of parameters and with each of the surface cells in order to obtain data sub-sets,
   wherein each data subset constitutes seven items S1-S7:
   S1: surface cell;
   S2: parameter type;
   S3: property of the parameter;
   S4: quantification of the parameter;
   S5: temporal validity of the quantification of the parameter;
   S6: date/time of update of this quintuple;
   S7: source of said quintuple,
   a step of treating and storing the data sub-sets in the at least one central data processing unit,
   a first search step comprising (1) constituting the free request in a language by the user on said at least one peripheral unit for interrogation of the data sub-sets in the at least one central data processing unit, and (2) analysis by the at least one peripheral unit of the language and interpretation of the free request comprising identification of parameters or the type of parameters, and generation of keywords and conditions for interrogation of the data sub-sets in the at least one central data processing unit,
   a second search step of searching and sorting the data sub-sets in the at least one central data processing unit using the identified parameters or types of parameters and the keywords and conditions,
   a step of selecting said data sub-sets based on the searching and sorting,
   a step of searching for and selecting surface cells associated with the selected data sub-sets,
   a step of displaying on the at least one peripheral unit for interrogation the place or places corresponding to the surface cells selected.

2. The process according to claim 1 further comprising:
   a step of proposing to the user once the first search is carried out, types of parameters available but different from those identified in the user's request for the purpose of optimizing the search.

3. The process according to claim 1 further comprising:
   a step of proposing to the user once the first search is carried out, quantifications for the parameters identified for the purpose of optimizing the search.

4. The process according to claim 1 further comprising the production of the data sub-sets with each having the following data fields:
   the geographical name or names of the surface cell,
   the type of parameter associated with said surface cell,
   the nature of said parameter,
   the quantification of said parameter,
   the temporal validity of the quantification of said parameter,
   the date/time of update of the preceding fields,
   the source/origin of the fields completed.

5. The process according to claim 2, wherein the parameter type is political.

6. The process according to claim 2, wherein the parameter type is educational.

7. The process according to claim 2, wherein the parameter type is of a sanitary nature.

8. The process according to claim 2, wherein the parameter type is military.

9. The process according to claim 2, wherein the parameter type is geopolitical and strategic.

10. The process according to claim 2, wherein the parameter type is administrative.

11. The process according to claim 2, wherein the parameter type is of a security nature.

12. The process according to claim 2, wherein the parameter type is environmental.

13. The process according to claim 1, wherein the free request is carried out in natural language.

14. A device comprising:
   at least one client computer for interrogation; at least one server computer connected to the at least one client computer,
   wherein the client computer and server computer are configured to implement a process of searching for a place or places on the basis of a free request of parameters defined by a user, the process comprising the following steps:
   a step of selecting and grouping types of parameters,
   a step of spatial cutting the terrestrial globe into surface cells according to said selection and said grouping of parameters, said cells being associated with a plurality of sensors that record identifiable parameters of each of said cells,
   a step of associating data from the sensors with the types of parameters and with each of the surface cells in order to obtain data sub-sets,
   wherein each data subset constitutes seven items S1-S7:
   S1: surface cell;
   S2: parameter type;
   S3: property of the parameter;
   S4: quantification of the parameter;
   S5: temporal validity of the quantification of the parameter;
   S6: date/time of update of this quintuple;
   S7: source of said quintuple,
   a step of treating and storing the data sub-sets in the at least one central data processing unit,
   a first search step comprising (1) the free request by the user on said at least one client computer for interrogation of the data sub-sets in the at least one server computer, and (2) analysis by the client computer of the language and interpretation of the free request comprising identification of parameters or the type of parameters, and the generation of keywords and conditions for interrogation of the data sub-sets in the at least one server computer, a second search step of searching and sorting the data sub-sets in the at least one server computer using the identified parameters or types of parameters and the keywords and conditions, a step of selecting said data sub-sets based on the searching and sorting, a step of searching for and selecting surface cells associated with the sorted and selected data sub-sets, a step of displaying on the at least one client computer for interrogation the place or places corresponding to the surface cells found, wherein the at least one server computer is configured for storing and managing said data sub-sets and is connected by a digital network to the at least one client computer (200), wherein the client computers has artificial intelligence for analysis and interpretation of the free request enabling it to interact with the user so as to collect a character string representing the free request and also provide the user with results in the form of multimedia documents.

15. The device according to claim 14 wherein each surface cell or set of surface cells includes a plurality of recording sensors of at least one identifiable parameter.

\* \* \* \* \*